US009523879B2

(12) United States Patent
Sung et al.

(10) Patent No.: US 9,523,879 B2
(45) Date of Patent: Dec. 20, 2016

(54) LIQUID CRYSTAL DISPLAY AND METHOD FOR FABRICATING THE SAME

(71) Applicant: Samsung Display Co., Ltd., Yongin, Gyeonggi-do (KR)

(72) Inventors: Woo Yong Sung, Yongin (KR); A Ram Lee, Yongin (KR); Tae Woon Cha, Yongin (KR); Seung Yeon Chae, Yongin (KR); Sang Gun Choi, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/479,585

(22) Filed: Sep. 8, 2014

(65) Prior Publication Data

US 2015/0268502 A1 Sep. 24, 2015

(30) Foreign Application Priority Data

Mar. 18, 2014 (KR) ........................ 10-2014-0031679

(51) Int. Cl.
*H01L 21/84* (2006.01)
*G02F 1/1333* (2006.01)
*G02F 1/1341* (2006.01)
*G02F 1/1337* (2006.01)

(52) U.S. Cl.
CPC ....... *G02F 1/133377* (2013.01); *G02F 1/1337* (2013.01); *G02F 1/1341* (2013.01)

(58) Field of Classification Search
CPC ... G02F 1/13394; G02F 1/1341; G02F 1/1337

USPC ......................................................... 438/162
See application file for complete search history.

(56) References Cited

U.S. PATENT DOCUMENTS

| 2004/0189916 | A1* | 9/2004 | Song ................. G02F 1/134336 349/139 |
| 2004/0263766 | A1* | 12/2004 | Lee et al. .................... 349/156 |
| 2005/0094043 | A1* | 5/2005 | Inoue ................ G02F 1/133784 349/34 |
| 2006/0038947 | A1* | 2/2006 | Rho .................. G02F 1/133711 349/122 |

(Continued)

FOREIGN PATENT DOCUMENTS

JP 2005-292685 10/2005
KR 10-2008-0018731 2/2008

(Continued)

*Primary Examiner* — Phat X Cao
*Assistant Examiner* — Mohammad M Hoque
(74) *Attorney, Agent, or Firm* — Knobbe Martens Olson & Bear LLP

(57) ABSTRACT

A liquid crystal display comprises: a substrate having a plurality of pixel regions; first electrode formed on the substrate in each of the pixel regions and including a plurality of separated branch electrodes; a cover layer forming a cavity with the substrate, the cover layer including side walls formed on the substrate to partition the plurality of pixel regions and a roof formed on the side walls; a second electrode formed on a bottom surface of the cover layer; a capping layer formed in the cavity to cover the first electrode on the substrate and to cover the second electrode on the bottom surface of the roof; an alignment layer formed on the capping layer; and a liquid crystal layer formed through injection of liquid crystal molecules into the cavity.

19 Claims, 19 Drawing Sheets

(56) References Cited

U.S. PATENT DOCUMENTS

| | | | |
|---|---|---|---|
| 2006/0186913 A1* | 8/2006 | Kim | G09G 3/006 324/760.02 |
| 2007/0078072 A1* | 4/2007 | Yokoi et al. | 510/175 |
| 2007/0139593 A1* | 6/2007 | Chen | G02F 1/1337 349/123 |
| 2007/0139597 A1* | 6/2007 | Shim | G02F 1/1362 349/139 |
| 2007/0164667 A1* | 7/2007 | Ha | H01L 27/3244 313/504 |
| 2007/0182900 A1* | 8/2007 | Hsiao | G02F 1/133555 349/128 |
| 2008/0049176 A1* | 2/2008 | Kim et al. | 349/114 |
| 2009/0141214 A1* | 6/2009 | Suzuki et al. | 349/75 |
| 2009/0219478 A1* | 9/2009 | Park | G02F 1/13731 349/155 |
| 2010/0157410 A1* | 6/2010 | Kim | G02B 26/004 359/291 |
| 2010/0201909 A1* | 8/2010 | Jung | G02F 1/133528 349/61 |
| 2010/0259712 A1* | 10/2010 | Jeong et al. | 349/128 |
| 2012/0001206 A1* | 1/2012 | Jeong | H01L 51/5215 257/89 |
| 2012/0257123 A1* | 10/2012 | Lee | 349/1 |
| 2014/0151696 A1* | 6/2014 | Kuwabara | H01L 27/1225 257/43 |
| 2014/0186996 A1* | 7/2014 | Takeuchi et al. | 438/104 |

FOREIGN PATENT DOCUMENTS

| | | |
|---|---|---|
| KR | 10-2011-0095744 | 8/2011 |
| KR | 10-2012-0056669 | 6/2012 |
| KR | 10-2013-0084842 | 7/2013 |

\* cited by examiner

LIQUID CRYSTAL DISPLAY AND METHOD FOR FABRICATING THE SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is based on, and claims priority from, Korean Patent Application No. 10-2014-0031679, filed on Mar. 18, 2014 in the Korean Intellectual Property Office, the disclosure of which is incorporated herein in its entirety by reference.

BACKGROUND

Field

The present disclosure relates to a liquid crystal display and a method for fabricating the same.

Description of the Related Technology

A liquid crystal display, which is one of display devices that have been widely used, is a display device that can adjust the quantity of penetrating light by applying a voltage to two opposite electrodes (a pixel electrode and a common electrode) and by controlling an arrangement of liquid crystal molecules of a liquid crystal layer interposed between the two electrodes.

Typically, a liquid crystal display is formed to keep a space between two substrates so that a liquid crystal layer is provided between the two substrates. For this, spacers are formed between the two substrates. However, since the spacers are adhered to one of the two substrates with adhesives, the liquid crystal display fabricating process may be complicated and the manufacturing cost may be increased.

SUMMARY OF CERTAIN INVENTIVE ASPECTS

In one aspect, there is provided a liquid crystal display comprising: a substrate having a plurality of pixel regions; a first electrode formed on the substrate in each of the pixel regions and including a plurality of separated branch electrodes; a cover layer forming a cavity with the substrate, the cover layer including side walls formed on the substrate to partition the plurality of pixel regions and a roof formed on the side walls; a second electrode formed on a bottom surface of the cover layer; a capping layer formed in the cavity to cover the first electrode on the substrate and to cover the second electrode on the bottom surface of the roof; an alignment layer formed on the capping layer; and a liquid crystal layer formed through injection of liquid crystal molecules into the cavity.

The capping layer may be conformally formed along a surface of the first electrode.

The capping layer may cover the cover layer and the substrate outside the cavity.

The capping layer may have a thickness of about 10 Å to 100 nm.

The capping layer may be an atomic layer deposition (ALD) layer, and may include an inorganic material of which a contact angle against an alignment material of the alignment layer is equal to or smaller than about 50°.

The capping layer may include at least one of $SiO_2$ or SiCOH.

The capping layer may comprise a first capping layer and a second capping layer formed on the first capping layer.

The first capping layer may be a molecular layer deposition (MLD) layer that includes an organic material, and the second capping layer may be an atomic layer deposition (ALD) layer that includes an inorganic material of which a contact angle against an alignment material of the alignment layer is equal to or smaller than about 50°.

The first capping layer may include at least one of polyimide, polystyrene, or polyethylene, and the second capping layer may include at least one of $SiO_2$ or SiCOH.

In another aspect, there is provided a liquid crystal display comprising: a substrate having a plurality of pixel regions; a first electrode formed on the substrate in each of the pixel regions and including a plurality of separated branch electrodes; a second electrode formed on the first electrode to be insulated from the first electrode; a remainder of a deteriorated layer formed between the plurality of separated branch electrodes; a capping layer formed on the substrate to cover the first electrode, the remainder of the deteriorated layer, and the second electrode; an alignment layer formed on the capping layer; and a liquid crystal layer formed on the alignment layer.

The remainder of the deteriorated layer may be a carbon content material.

The capping layer may be conformally formed along a surface of the first electrode.

The capping layer may have a thickness of about 10 Å to 100 nm.

The capping layer may be an atomic layer deposition (ALD) layer, and may include an inorganic material of which a contact angle against an alignment material of the alignment layer is equal to or smaller than about 50°.

The capping layer may include at least one of $SiO_2$ or SiCOH.

The liquid crystal display may further comprise a cover layer which covers the second electrode and forms a cavity together with the substrate, where the cover layer includes side walls formed on the substrate to partition the plurality of pixel regions and a roof formed on the side walls.

In another aspect, there is provided a method for fabricating a liquid crystal display, comprising: forming a first electrode that includes a plurality of separated branch electrodes in each of a plurality of pixel units on a substrate; forming a sacrificial layer on the substrate to cover the first electrode; forming a second electrode on the sacrificial layer; forming a cover layer which covers the second electrode and includes side walls formed on the substrate to partition the plurality of pixel regions and a roof formed on the side walls; removing the sacrificial layer; forming a capping layer to cover the first electrode on the substrate and to cover the second electrode on a bottom surface of the roof; and forming an alignment layer on the capping layer.

Forming the capping layer may comprise forming the capping layer including an inorganic material, of which a contact angle against an alignment material of the alignment layer is equal to or smaller than about 50°, using an atomic layer deposition (ALD) method.

The method for fabricating a liquid crystal display may further comprise forming a liquid crystal injection port on one side surface of the side walls of the cover layer, wherein removal of the sacrificial layer may be performed through the liquid crystal injection port.

The method for fabricating a liquid crystal display may further comprise forming a liquid crystal layer through injection of liquid crystal molecules through the liquid crystal injection port; and forming a sealing layer to seal the liquid crystal injection port after the forming the liquid crystal layer.

According to embodiments of the present invention, at least the following effects can be achieved.

According to the liquid crystal display according to an embodiment, since the capping layer having the hydrophilic characteristics is formed to cover the pixel electrode, the remainder of a deteriorated layer, and the common electrode, the spread performance of the alignment material is improved, and thus the alignment layer can be uniformly formed on the pixel electrode and the common electrode.

Further, according to the liquid crystal display according to an embodiment, the capping layer is formed as an atomic layer deposition (ALD) layer to minimize the voids of the protection layer, and thus moisture or gas can be prevented from penetrating into the cavity.

Accordingly, the abnormal behavior of the liquid crystal molecules, which may occur due to the inferiority of the alignment layer and penetration of the moisture or gas into the cavity, can be prevented, and thus the reliability of the display quality of the liquid crystal display can be heightened.

The effects according to embodiments of the present invention are not limited to the contents as exemplified above, but further various effects are included in the description.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF CERTAIN INVENTIVE EMBODIMENTS

Figure 1:
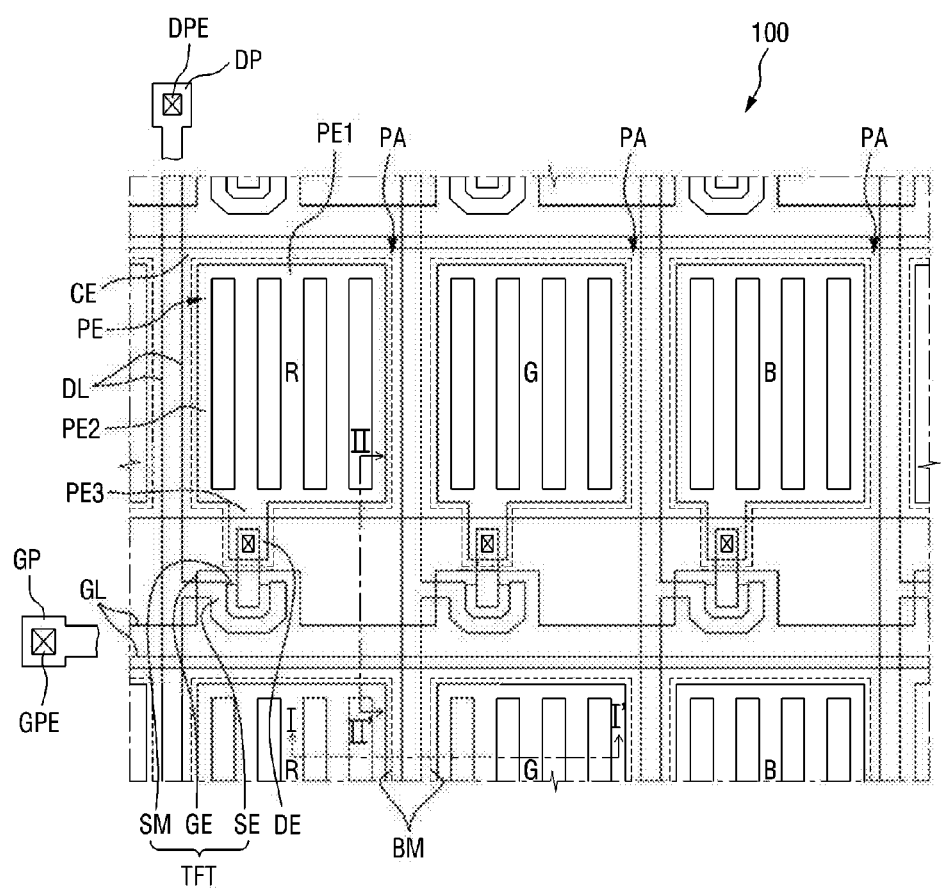
FIG. 1 is a plan view of a liquid crystal display according to an embodiment.

Advantages and features of the present invention and methods of accomplishing the same may be understood more readily by reference to the following detailed description of certain embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

It will also be understood that when a layer is referred to as being "on" another layer or substrate, it can be directly on the other layer or substrate, or intervening layers may also be present. The same reference numbers generally indicate the same components throughout the specification.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

In order to simplify the liquid crystal display fabricating process and to reduce the manufacturing cost, a liquid crystal display has been developed, which includes a cavity for providing a space where a liquid crystal layer is formed on one substrate instead of spacers formed between two substrates.

The cavity may be formed by removing a sacrificial layer after a pixel electrode, the sacrificial layer, a common electrode, a protection layer, and a cover layer are formed on one substrate. The removal of the sacrificial layer may be performed through a liquid crystal injection port that is formed on the cover layer.

However, during removal of the sacrificial layer, a part of photoresist, which is a sacrificial layer forming material, may not be removed, and thus a residual material in a deteriorated state may remain in the cavity, and particularly on a patterned pixel electrode portion in the center of the cavity. Such a residual material has hydrophobic characteristics, and when an alignment layer is formed to cover the pixel electrode and the common electrode in the cavity, an alignment material may not be spread well on a residual material portion. Due to this, inferiority that the alignment layer is not formed on the residual material portion may occur, and due to such alignment layer inferiority, abnormal behavior of liquid crystal molecules, which form the liquid crystal layer, may occur to lower reliability of the display quality of the liquid crystal display.

Further, the protection layer is typically formed in a plasma enhanced chemical vapor deposition (PECVD) method at low temperature, and in this case, a large number of voids may occur in the protection layer. Such voids may provide paths through which moisture or gas, which are generated in the process, penetrates into the cavity. Due to the penetration of the moisture or gas, the abnormal behavior of the liquid crystal molecules may occur to lower the reliability of the display quality of the liquid crystal display.

Accordingly, embodiments of the liquid crystal display disclosed herein can prevent inferiority of an alignment layer inside a cavity and can prevent penetration of moisture or gas into the cavity.

Embodiments of a method for fabricating a liquid crystal display disclosed herein can prevent inferiority of an alignment layer inside a cavity and can prevent penetration of moisture or gas into the cavity.

Additional advantages and features of the invention will be set forth in part in the description which follows and in part will become apparent to those having ordinary skill in the art upon examination of the following or may be learned from practice of the invention.

Hereinafter, embodiments of the present invention will be described with reference to the accompanying drawings.

Figure 2:
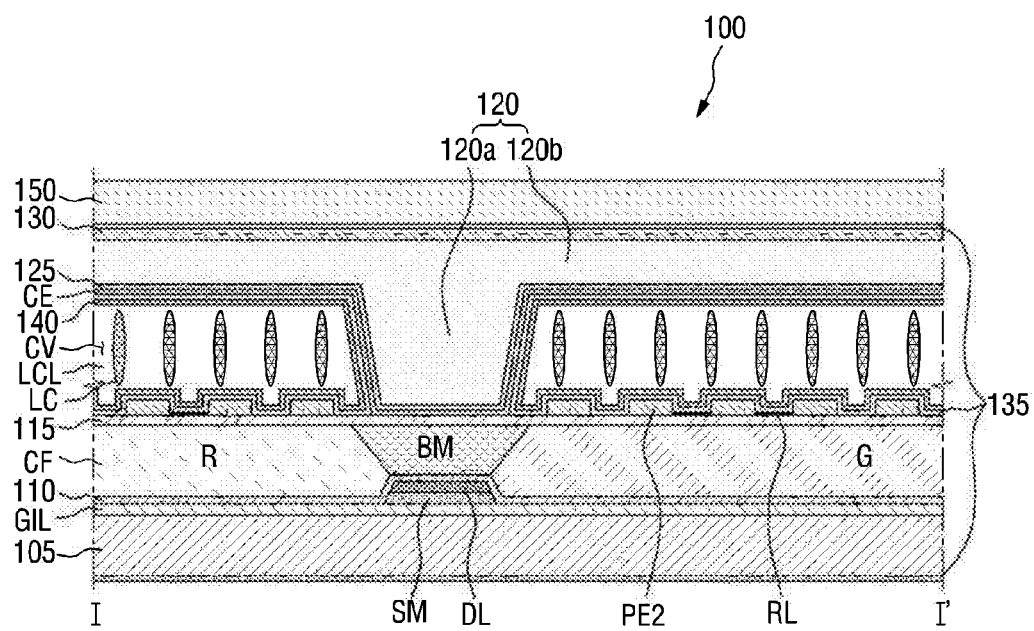
FIG. 2 is a cross-sectional view taken along line I-I' of FIG. 1.
Figure 3:
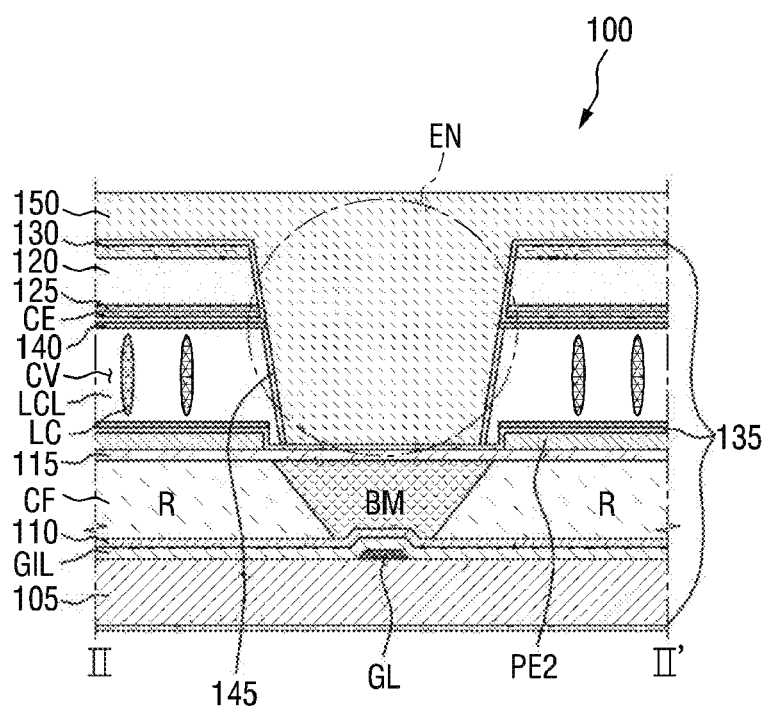
FIG. 3 is a cross-sectional view taken along line II-II' of FIG. 1.
Figure 4:
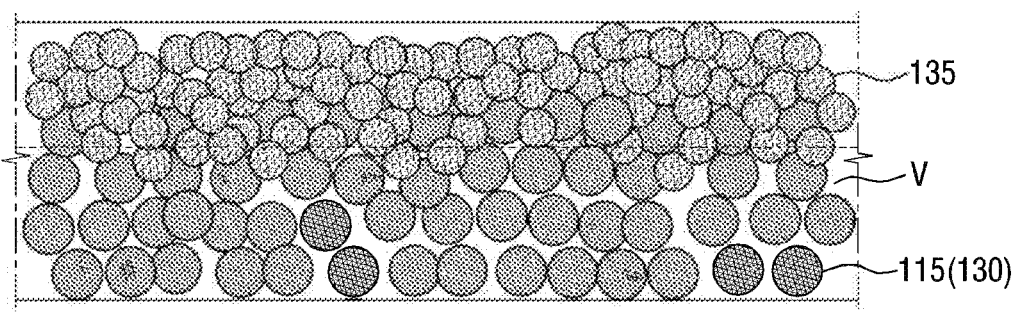
FIG. 4 is a cross-sectional view schematically illustrating the bonding relationship between a first protection layer (or a third protection layer) and a capping layer of FIG. 2.
Figure 5:
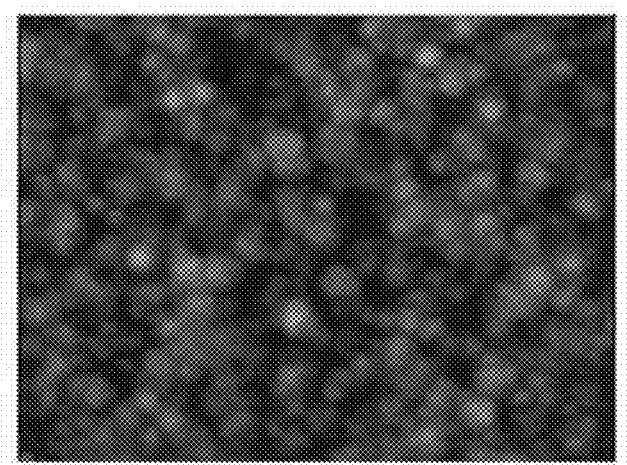
FIG. 5 is a photograph showing the surface of a capping layer of FIG. 2.

FIG. 1 is a plan view of a liquid crystal display according to an embodiment, FIG. 2 is a cross-sectional view taken along line I-I' of FIG. 1, and FIG. 3 is a cross-sectional view taken along line II-II' of FIG. 1. FIG. 4 is a cross-sectional view schematically illustrating the bonding relationship between a first protection layer (or a third protection layer) and a capping layer of FIG. 2, and FIG. 5 is a photograph showing the surface of a capping layer of FIG. 2.

Referring to FIGS. 1 to 3, a liquid crystal display 100 may include a substrate 105, a gate line GL, a data line DL, a gate insulating layer GIL, a thin film transistor TFT, an insulating layer 110, color filters CF, a black matrix BM, a first protection layer 115, a pixel electrode (also referred to as a "first electrode") PE, a cover layer 120, a common electrode (also referred to as a "second electrode") CE, a second protection layer 125, a third protection layer 130, a capping layer 135, an alignment layer 140, a liquid crystal layer LCL, a sealing layer 145, and a planarization layer 150.

The substrate 105 may be a transparent insulating substrate, and may have a plurality of pixel regions PA that are defined by the gate line GL and the data line DL.

The gate line GL is formed on the substrate 105 to extend in a first direction, and transfers a gate signal. A gate pad GP is connected to one end of the gate line GL. A gate pad electrode GPE may be formed on the gate pad GP. The gate pad electrode GPE is a contact electrode that connects an external wiring for applying a signal to the pixel electrode PE.

The data line DL is formed on the substrate 105 to extend in a second direction that crosses the first direction, is isolated from the gate line GL, and transfers a data signal. A data pad DP is connected to one end of the data line DL. A data pad electrode DPE may be formed on the data pad DP. The data pad electrode DPE is another contact electrode that connects an external wiring for applying a signal to the pixel electrode PE.

The gate insulating layer GIL covers the gate line GL formed on the surface of the substrate 105 and the gate pad GP, and includes an insulating material. For example, the gate insulating layer GIL may include silicon nitride or silicon oxide. The data line DL and the data pad DP may be formed on the gate insluting layer GIL in some embodiments.

The thin film transistor TFT includes a gate electrode GE, a semiconductor layer SM, a source electrode SE, and a drain electrode DE.

The gate electrode GE may be formed to project from the gate line GL toward the semiconductor layer SM on plane. The gate electrode GE may include any one or more of indium tin oxide (ITO), indium zinc oxide (IZO), and indium tin zinc oxide (ITZO). Further, the gate electrode GE may have a two-layer structure including a first electrode layer including the above-described material and a second electrode layer including a material as described below. The second electrode layer may include a metal, such as, for example, copper (Cu), molybdenum (Mo), aluminum (Al), tungsten (W), chrome (Cr), or titanium (Ti), or an alloy including at least one of the above-described metals.

The semiconductor layer SM is formed on the gate electrode GE on the intervention of the gate insulating layer GIL. The semiconductor layer SM may include an active layer provided on the gate insulating layer GIL and an ohmic contact layer provided on the active layer. In some embodiments, the semiconductor layer SM may be formed between the data line DL and the gate insulating layer GIL. Further, the semiconductor layer SM may also be formed between the data pad DP and the gate insulating layer GIL.

The source electrode SE is formed to project from the data line DL, and overlaps at least a part of the gate electrode GE on plane. The drain electrode DE is formed to be spaced apart from the source electrode SE, and overlaps at least a part of the gate electrode GE on plane. The source electrode SE and the drain electrode DE may include a metal, such as, for example, copper, molybdenum, aluminum, tungsten, chrome, or titanium, or an alloy including at least one of the above-described metals. Here, the source electrode SE and the drain electrode DE overlap a part of the semiconductor layer SM in a region other than a region where the source electrode SE and the drain electrode DE are spaced apart from each other.

The insulating layer 110 is formed on the gate insulating layer GIL, and may have through-holes for exposing the drain electrode DE, the gate pad GP, and the data pad DP. The insulating layer 110 may include, for example, silicon nitride or silicon oxide.

The color filters CF are formed on the insulating layer 110 to correspond to the respective pixel regions PA. The color filters CF are to provide colors to light that penetrates the liquid crystal layer LCL, and may include a red filter (R), a green filter (G), and a blue filter (B). However, the color filters CF are not limited to the above-described color filters.

The black matrix BM may be formed on the insulating layer 110 at the edge of each pixel region PA. The black matrix BM may be arranged to surround the color filters CF. The black matrix BM may overlap the data line DL and the thin film transistor TFT. The black matrix BM includes a light interception material and intercepts unnecessary light in representing an image. For example, the black matrix BM may intercept light leakage, which may occur at the edge of the liquid crystal layer LCL due to an abnormal behavior of the liquid crystal molecules LC, or color mixture, which may appear at the edges of the color filters CF.

The first protection layer 115 is formed on the color filters CF and the black matrix BM, and may serve to planarize the color filters CF and the black matrix BM. Further, the first protection layer 115 may protect the color filters DF and the black matrix BM, and may reduce damage of the color filters CF and the black matrix BM due to the last $O_2$ ashing process to remove the remainder in a cavity CV in the procedure of forming the cavity CV into which liquid crystal molecules LC are injected. The first protection layer 115 may include at least one of SiNx, SiOx, and SiOxNy.

The pixel electrode PE is formed on the substrate 105, and specifically, on the first protection layer 115 in the unit of pixel region PA, and is connected to the drain electrode DE. The pixel electrode PE includes at least one trunk electrode PE1, a plurality of branch electrodes PE2 formed to project from the trunk electrode PE1, and a connection electrode PE3 connecting the trunk electrode PE1 and the drain electrode DE to each other. The branch electrodes PE2 are spaced apart or separated by a predetermined distance from each other. The branch electrodes PE2 may be formed to extend in parallel in a predetermined direction. The trunk electrode PE1 and the branch electrodes PE2 are not limited to the arrangement as illustrated in FIG. 1, but may have various arrangements. The pixel electrode PE may include a transparent conductive material, for example, indium tin oxide (ITO) or indium zinc oxide (IZO). The pixel electrode PE may have a thickness of about 550 Å.

The cover layer 120 includes side walls 120a formed on the substrate 105 to partition a plurality of pixel regions and a roof 120b formed on the side walls 120a to connect the side walls 120a to each other, and forms the cavity CV with the substrate 105. The cover layer 120 may include an organic material. The cover layer 120 may further include a liquid crystal injection port EN that is formed in a portion which is formed along the first direction of the substrate 105 and overlaps the gate line GL. The liquid crystal injection port EN may be formed on one side surface of the side walls 120a that are parallel to the first direction of the substrate 105 in the unit of a pixel region to enable the liquid crystal molecules LC to be injected into the cavity CV.

The common electrode CE is formed on a bottom surface of the cover layer 120, and is formed to come in contact with the first protection layer 115 on the bottom surface of the side walls 120a and to be spaced apart from the pixel electrode PE on the bottom surface of the roof 120b. The common electrode CE may include a transparent conductive material, for example, indium tin oxide (ITO) or indium zinc oxide (IZO), and may serve to control the alignment direction of the liquid crystal molecules LC through generation of an electric field with the pixel electrode PE. In some embodiments, a part of the liquid crystal injection port EN may be formed through removal of a part of the common electrode CE.

The second protection layer 125 is formed between the common electrode CE and the cover layer 120 to protect the common electrode CE. The second protection layer 125 may include at least one of SiNx, SiOx, and SiOxNy. In some embodiments, a part of the liquid crystal injection port EN may be formed through removal of a part of the second protection layer 125.

The third protection layer 130 is formed on the cover layer 120 to protect the cover layer 120. The third protection layer 130 may include at least one of SiNx, SiOx, and SiOxNy. A part of the liquid crystal injection port EN may be formed through removal of a part of the third protection layer 130.

The capping layer 135 may be formed inside the cavity CV to cover the pixel electrode PE on the substrate 105 and to cover the common electrode CE on the bottom surface of the roof 120b. Further, if a remainder RE of a deteriorated layer is present between the branch electrodes PE2 of the pixel electrode PE in the cavity CV, the capping layer 135 may be formed inside the cavity CV to cover the pixel electrode PE and the remainder RE of the deteriorated layer on the substrate 105 and to cover the common electrode CE on the bottom surface of the roof 120b. The remainder RE of the deteriorated layer is a residual material (carbon content material) corresponding to photoresist that is a sacrificial layer forming material which is not removed and remains in a deteriorated state during removal of the sacrificial layer that is formed between the substrate 105 and the cover layer 120 to form the cavity CV. The remainder RE of the deteriorated layer has hydrophobic characteristics, and when the alignment layer 140 is formed to cover the pixel electrode PE, the alignment material may not be spread well on the residual material portion to form the non-uniform alignment layer 140. The remainder RE of the deteriorated layer may recognizably remain in the cavity as shown in FIG. 2, or may be almost non-recognizably remain in the cavity CV.

The capping layer 135 may include a material having hydrophilic characteristics, such as, for example, an inorganic material of which the contact angle against the alignment material of the alignment layer 140 is equal to or smaller than about 50°. For example, the capping layer 135 may include a material that includes at least one of $SiO_2$ and SiCOH. Since the capping layer 135 has hydrophilic characteristics, the spread performance of the alignment material is improved, and thus the alignment layer 140 that covers the pixel electrode PE and the common electrode CE in the cavity CV can be formed uniformly. Further, even in the case where the recognizable remainder RE of the deteriorated layer remains between the branch electrodes PE2 of the pixel electrode PE in the cavity CV, the capping layer 135 enables the alignment layer 140 that covers the pixel electrode PE, the remainder RE of the deteriorated layer, and the common electrode CE in the cavity CV to be uniformly formed.

The capping layer 135 may include an atomic layer deposition (ALD) layer formed using an ALD method.

The ALD method is performed in a scanning manner, and when the capping layer 135 is formed in the cavity CV, the cover layer 120 outside the cavity CV, including the third protection layer 130 and the substrate 105, can be covered by the capping layer 135.

The ALD method is used to form a thin film. Since the ALD method can control the thickness of a layer with high accuracy, the capping layer 135 can be formed with a thin thickness, for example, with a thickness of about 10 Å to 100 nm. Accordingly, capping layer 135 does not largely interrupt the penetration of light.

Further, since the ALD layer that is formed by the ALD method has high uniformity and step coverage, the capping layer 135 can be conformally formed with a uniform thickness along the pixel electrode PE that has a plurality of separated branch electrodes PE2.

Further, the ALD layer that is formed by the ALD method has high compactness, and may be formed to have a structure in which atoms of the capping layer 135 fill voids V formed in the first protection layer 115 or the third protection layer 130 that is formed at low temperature in a plasma enhanced chemical vapor deposition (PECVD) method as illustrated in FIG. 4. In this case, as illustrated in FIG. 5, almost no void may exist in the capping layer 135. Accordingly, when moisture or gas penetrates into the cavity CV, the capping layer 135 serves as a barrier to prevent abnormal behavior of the liquid crystal molecules LC in the cavity CV.

As described above, the capping layer 135 prevents the inferiority of the alignment layer 140 and prevents the moisture or gas from penetrating into the cavity CV to heighten the reliability of the display quality of the liquid crystal display. This effect can be observed through FIGS. 6 and 7.

Figure 6:
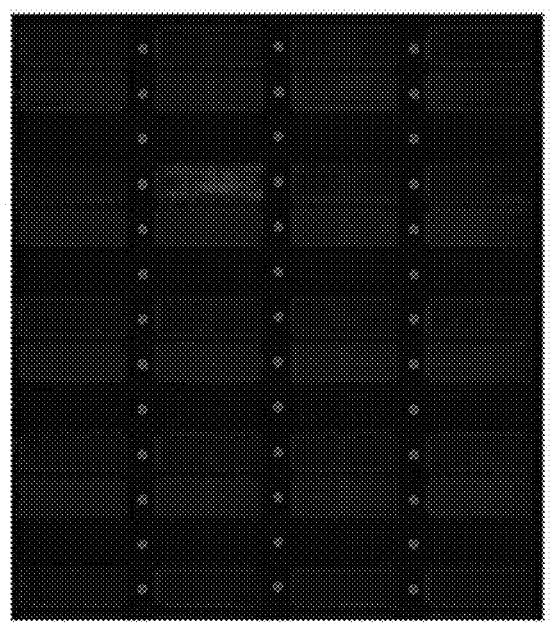
FIG. 6 is a photograph showing the occurrence of display inferiority in a liquid crystal display according to a comparative example.
Figure 7:
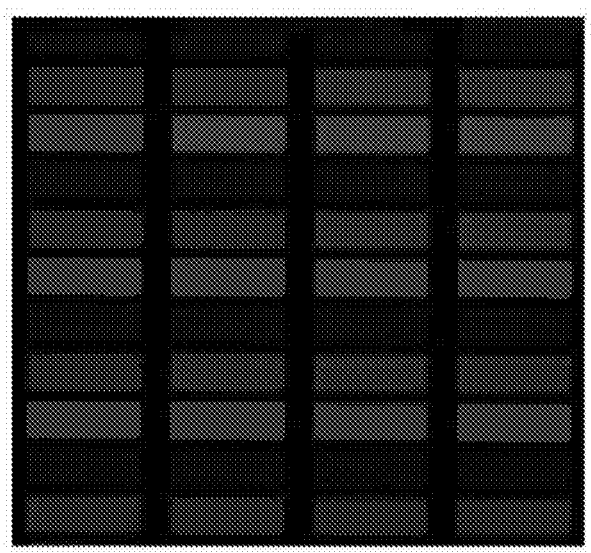
FIG. 7 is a photograph showing the nonoccurrence of display inferiority in a liquid crystal display according to an embodiment.

FIG. 6 is a photograph showing the occurrence of display inferiority in a liquid crystal display according to a comparative example, and FIG. 7 is a photograph showing the nonoccurrence of display inferiority in a liquid crystal display according to an embodiment. The liquid crystal display according to the comparative example has a structure in which the alignment layer is formed inside the cavity without the capping layer. In this case, as can be seen from the photograph of FIG. 6, the display quality of the red pixels becomes deteriorated. In contrast, the liquid crystal display 100 according to an embodiment of has a structure in which the alignment layer 140 is formed on the capping layer 135 that is formed inside the cavity CV. In this case, as can be seen from the photograph of FIG. 7, the display quality of all the red pixels, green pixels, and blue pixels is superior.

The alignment layer 140 is formed on the capping layer 135 inside the cavity CV. The alignment layer 140 may include an alignment material, such as polyamic acid, polysiloxane, or polyimide.

The liquid crystal layer LCL is formed through injection of liquid crystal molecules into the cavity CV. The liquid crystal molecules may be aligned by the alignment layer 140.

The sealing layer 145 is formed to seal the liquid crystal injection port EN of the cavity CV. The sealing layer 145 may be include a sealing material that does not react on the liquid crystal molecules LC that are injected into the cavity CV.

The planarization layer 150 is formed on the capping layer 135 outside the cavity CV, and serves to planarize and protect the capping layer 135 and other configurations positioned on the lower portion of the capping layer 135.

Although not illustrated, the liquid crystal display may further include an encapsulation layer that is formed on the planarization layer 150. The encapsulation layer enables the other substrate that is combined with the substrate on which thin film transistors are formed to be omitted from the existing liquid crystal display.

In the liquid crystal display having the above-described structure, the thin film transistor TFT is turned on in response to a driving signal provided through the gate line GL. When the thin film transistor TFT is turned on, an image signal that is provided through the data line DL is provided to the pixel electrode PE through the thin film transistor TFT. Accordingly, an electric field is formed between the pixel electrode PE and the common electrode DE, and liquid crystals of the liquid crystal layer LC are driven by the electric field to display an image as a result.

As described above, according to the liquid crystal display 100 according to an embodiment of the present invention, since the capping layer 135 that has hydrophilic characteristics is formed to cover the pixel electrode PE, the remainder RE of the deteriorated layer, and the common electrode CE, the spread performance of the alignment material is improved, and thus the alignment layer 140 can be uniformly formed on the pixel electrode PE and the common electrode CE.

Accordingly, the abnormal behavior of the liquid crystal molecules that occurs due to the inferiority of the alignment layer can be prevented, and thus the reliability of the display quality can be heightened.

Further, according to the liquid crystal display according to an embodiment, since the capping layer 135 is formed as the ALD layer, the voids of the first protection layer 115 and the third protection layer 130 can be minimized, and thus the moisture or gas can be prevented from penetrating into the cavity CV.

Accordingly, the abnormal behavior of the liquid crystal molecules that occurs due to the penetration of the moisture or gas into the cavity can be prevented, and thus the reliability of the display quality can be heightened.

Next, a liquid crystal display 200 according to another embodiment will be described.

Figure 8:
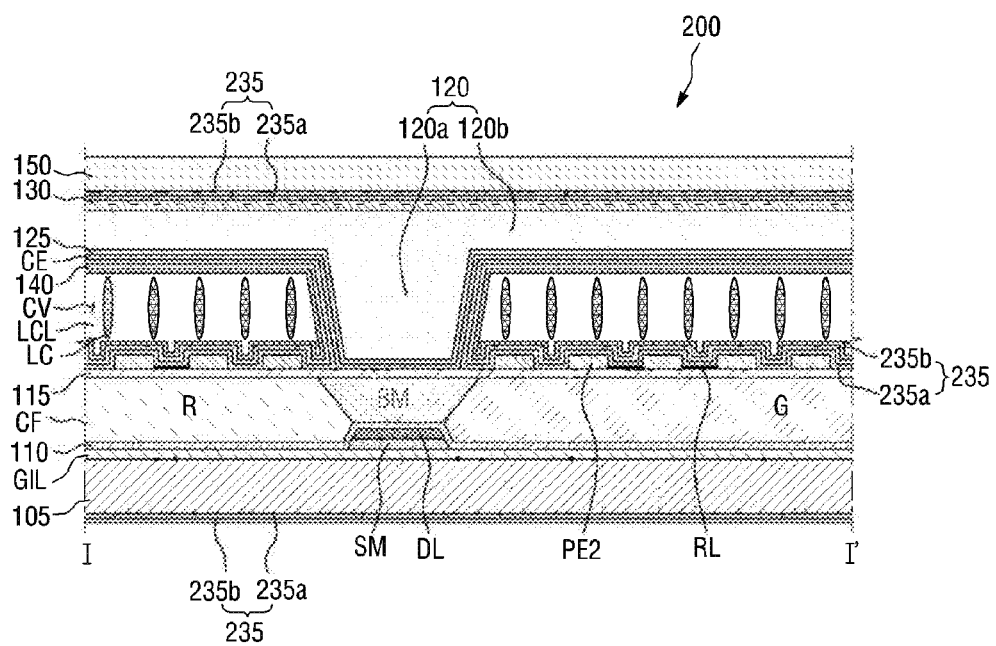
FIG. 8 is a cross-sectional view of a portion of a liquid crystal display, which corresponds to FIG. 2, according to another embodiment.
Figure 9:
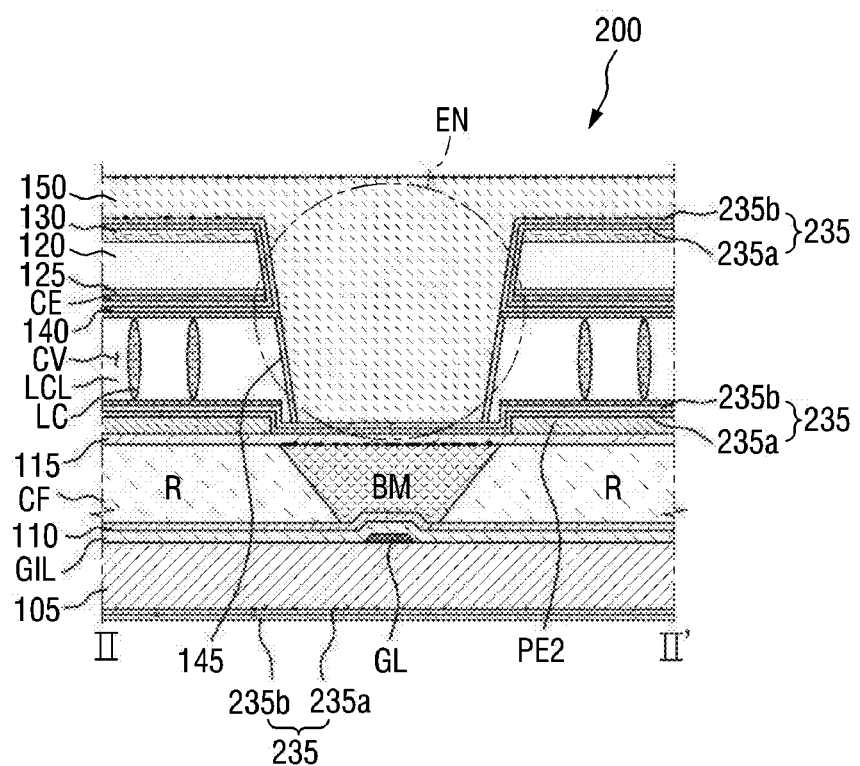
FIG. 9 is a cross-sectional view of a portion of a liquid crystal display, which corresponds to FIG. 3, according to still another embodiment.

FIG. 8 is a cross-sectional view of a portion of a liquid crystal display, which corresponds to FIG. 2, according to another embodiment, and FIG. 9 is a cross-sectional view of a portion of a liquid crystal display, which corresponds to FIG. 3, according to still another embodiment.

A liquid crystal display 200 according to another embodiment is different from the liquid crystal display 100 of FIGS. 2 and 3 in that a capping layer 235 has a different structure. Accordingly, in explaining the liquid crystal display 200, explanation will be made around the capping layer 235.

The liquid crystal display 200 may include a substrate 105, a gate line GL, a data line DL, a gate insulating layer GIL, a thin film transistor TFT, an insulating layer 110, color filters CF, a black matrix BM, a first protection layer 115, a pixel electrode (also referred to as a "first electrode") PE, a cover layer 120, a common electrode (also referred to as a "second electrode") CE, a second protection layer 125, a third protection layer 130, a capping layer 235, an alignment layer 140, a liquid crystal layer LCL, a sealing layer 145, and a planarization layer 150.

The capping layer 235 may be a multilayer that includes, for example, a first capping layer 235a and a second capping layer 235b.

The first capping layer 235a is a molecular layer deposition (MLD) layer that includes an organic material having a similar dielectric constant to the alignment layer 140 using an MLD method, and may include at least one of polyimide, polystyrene, and polyethylene. The first capping layer 235a can decrease layer stress of the pixel electrode PE through reduction of stress concentration onto an angled portion of the pixel electrode PE, and thus can improve the durability of the liquid crystal display. Further, the first capping layer 235a can prevent the increase of the driving power that is required to drive the liquid crystal display.

The second capping layer 235b is an ALD layer that includes an inorganic material of which the contact angle against the alignment material of the alignment layer 140 is equal to or smaller than about 50°, and may include at least one of $SiO_2$ and SiCOH. Since the role of the second capping layer 235b is the same as the role of the capping layer 135 of FIGS. 2 and 3, the duplicate explanation thereof is omitted.

As described above, according to the liquid crystal display 200, since the capping layer 235 is formed as a multilayer, the driving power is prevented from being increased, and the durability can be improved. In addition, the abnormal behavior of the liquid crystal molecules can be prevented, and thus the reliability of the display quality can be heightened.

Hereinafter, a method for fabricating a liquid crystal display according to an embodiment of the present invention will be described.

FIGS. 10 to 21 are cross-sectional views of processing steps explaining a method for fabricating a liquid crystal display according to an embodiment of the present invention.

Figure 10:
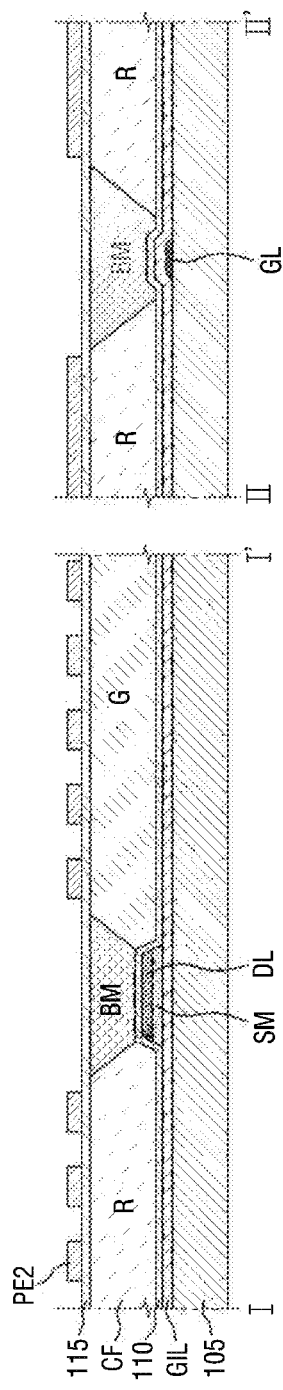
FIGS. 10 to 21 are cross-sectional views of processing steps explaining a method for fabricating a liquid crystal display according to an embodiment.

First referring to FIG. 10, a pixel electrode (PE in FIG. 1) is formed on a substrate 105.

Specifically, a conductive layer is formed on the substrate 105 through a sputtering process or the like, and the formed conductive layer is patterned using a photolithography process to form a gate line (GL in FIG. 1). In this case, a gate pad (GP in FIG. 1) and a gate electrode (GE in FIG. 1) are simultaneously formed.

Then, a gate insulating layer GIL is formed on the substrate 105, on which the gate pad GP and the gate electrode GE are formed, through a PECVD process.

Then, a semiconductor material layer and a conductive layer are successively stacked on the gate insulating layer GIL, and the patterning thereof is performed using a photolithography process to form a data line DL, a source electrode (SE in FIG. 1) connected to the data line DL, a drain electrode (DE in FIG. 1) that is spaced apart from the source electrode (SE in FIG. 1), and a semiconductor layer SM that is formed on a region corresponding to a region between the source electrode (SE in FIG. 1) and the drain electrode (DE in FIG. 1). In this case, a data pad (DP in FIG. 1) is simultaneously formed. Here, the gate electrode (GE in FIG. 1), the semiconductor layer SM, the source electrode (SE in FIG. 1), and the drain electrode (DE in FIG. 1) form a thin film transistor (TFT in FIG. 1).

Then, an insulating layer 110 is formed on the gate insulating layer GIL to cover the thin film transistor TFT and the data pad DP. The insulating layer 110 is a protection layer, and may include silicon nitride or silicon oxide through the PECVD process.

Then, a color filter CF may be formed on a position corresponding to a pixel region (PA in FIG. 1) on the insulating layer 110. The color filter CF may be one of a red color filter (R), a green color filter (G), and a blue color filter (B), and may be formed by patterning an organic polymer material through a photolithography process or by printing the organic polymer material through an ink jet process.

Then, a black matrix BM may be formed on a position corresponding to the edge of the pixel region (PA in FIG. 1) on the insulating layer 110. The black matrix BM may be formed by patterning a light interception material through the photolithography process.

Then, a first protection layer 115 is formed on the color filter CF and the black matrix BM. The first protection layer 115 may include at least one of SiNx, SiOx, and SiOxNy through a deposition process, such as a PECVD method, at low temperature.

Then, a pixel electrode (PE in FIG. 1) that includes a plurality of separated branch electrodes PE2 is formed on the first protection layer 115 in the unit of a pixel region (PA in FIG. 1). The pixel electrode (PE in FIG. 1) is connected to the drain electrode (DE in FIG. 1). The pixel electrode (PE in FIG. 1) may be formed by forming a transparent conductive material layer on the first protection layer 115 and then patterning the formed transparent conductive material layer using the photolithography process.

Figure 11:
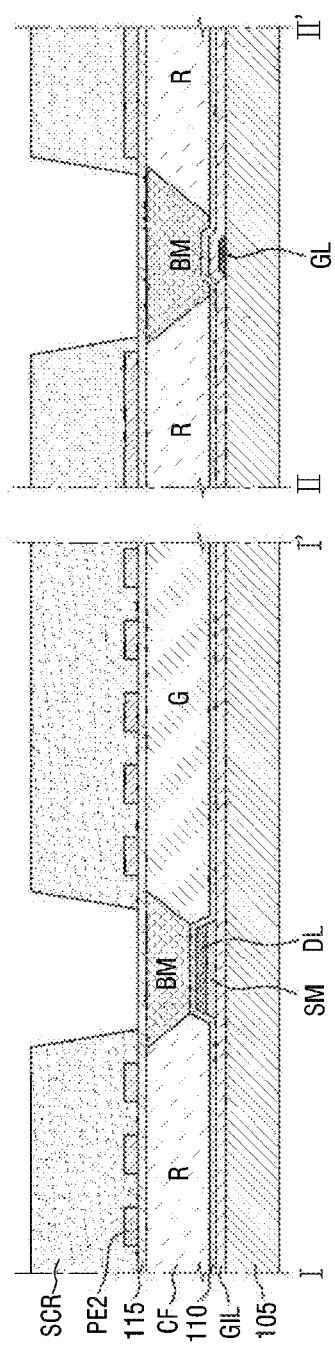

Then, referring to FIG. 11, a sacrificial layer SCR is formed on the substrate 105, specifically, on the first protection layer 115, to cover the pixel electrode (PE in FIG. 1) in the unit of a pixel region (PA in FIG. 1). The sacrificial layer SCR may be formed by patterning a photoresist material through the photolithography process.

Figure 12:
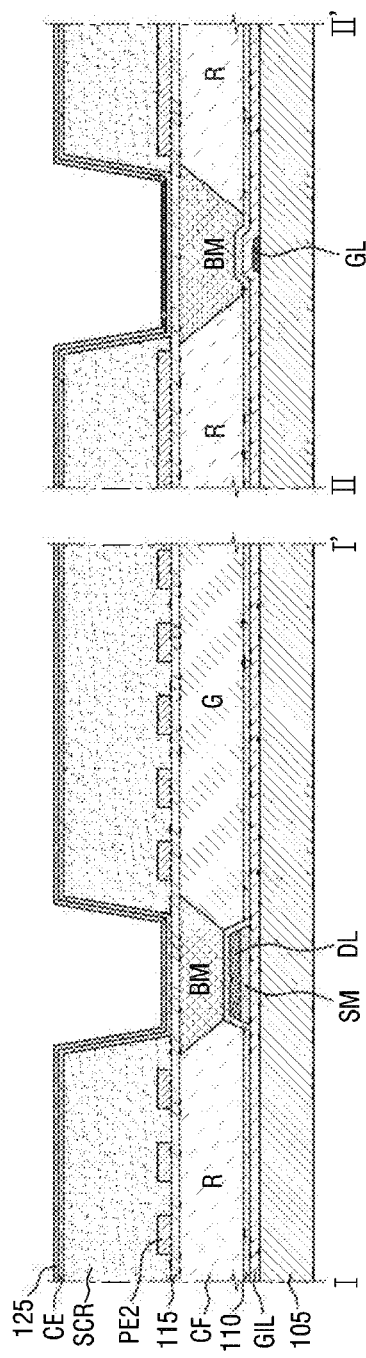

Then, referring to FIG. 12, a common electrode CE and a second protection layer 125 are sequentially formed on the first protection layer 115 on which the sacrificial layer SCR is formed. The common electrode CE may include indium tin oxide (ITO) or indium zinc oxide (IZO) through a deposition process, and the second protection layer 125 may include at least one of SiNx, SiOx, and SiOxNy through a deposition process, such as a PECVD method.

Figure 13:
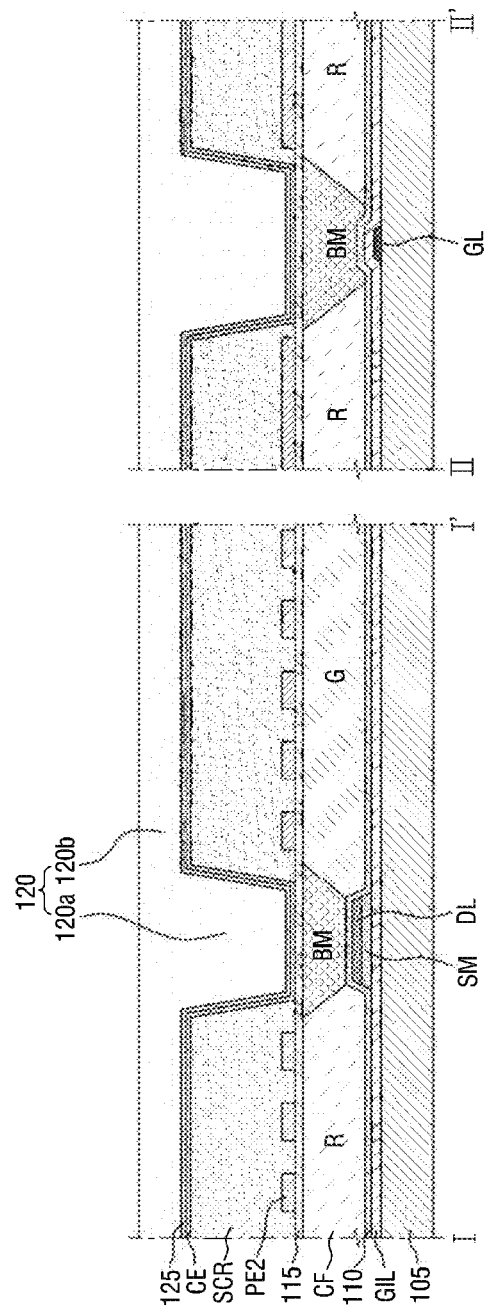

Then, referring to FIG. 13, a cover layer 120, which includes side walls 120a that partitions a plurality of pixel regions PA and a roof 120b formed on the side walls 120a to connect the side walls 120a to each other, is formed on the second protection layer 125. The cover layer 120 may include an organic material.

Figure 14:
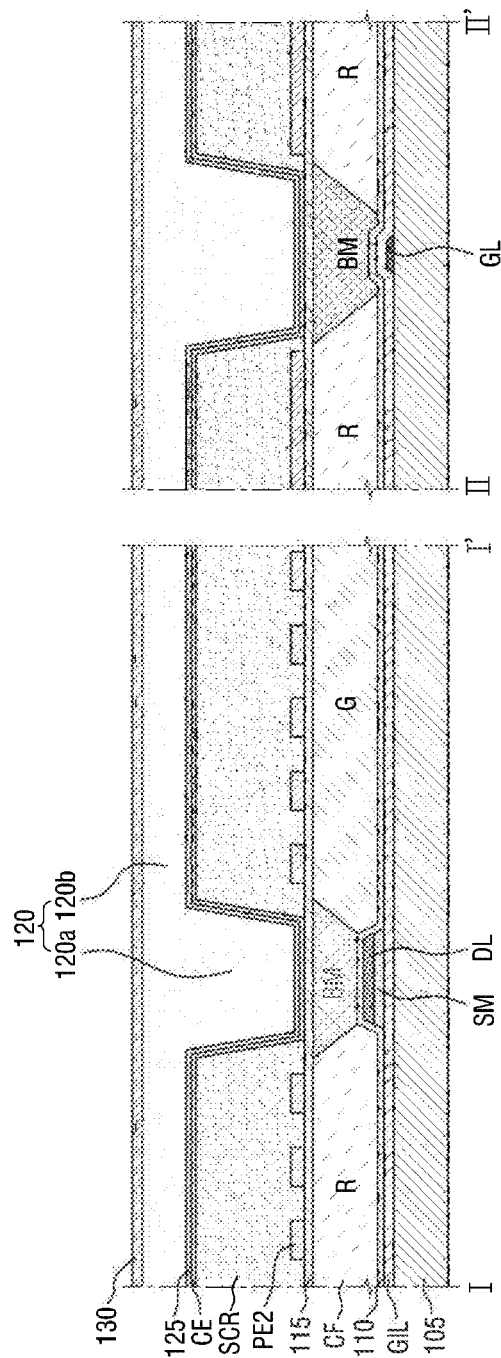

Then, referring to FIG. 14, a third protection layer 130 is formed on the cover layer 120. The third protection layer 130 may include at least one of SiNx, SiOx, and SiOxNy through a deposition process, such as a PECVD method.

Figure 15:
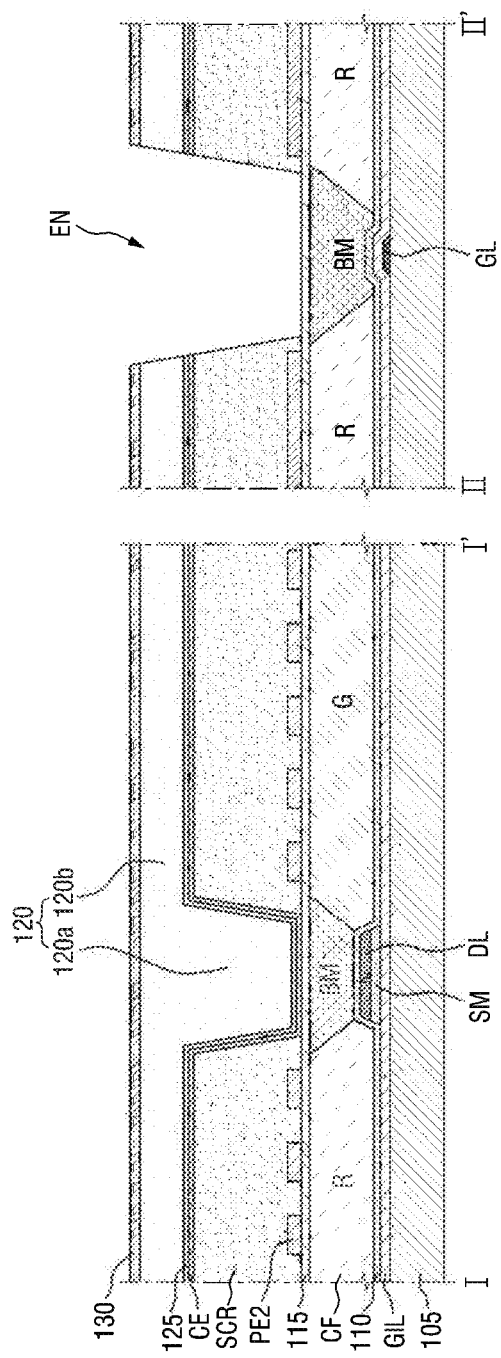

Then, referring to FIG. 15, a liquid crystal injection port EN is formed on a portion which is formed along the first direction of the substrate 105 and overlaps the gate line GL.

Specifically, the liquid crystal injection port EN is formed on one side surface of the side walls 120a of the cover layer 120. The liquid crystal injection port EN may be formed through a photolithography process. In this case, parts of the third protection layer 130, the second protection layer 125, and the common electrode CE may be removed.

Figure 16:
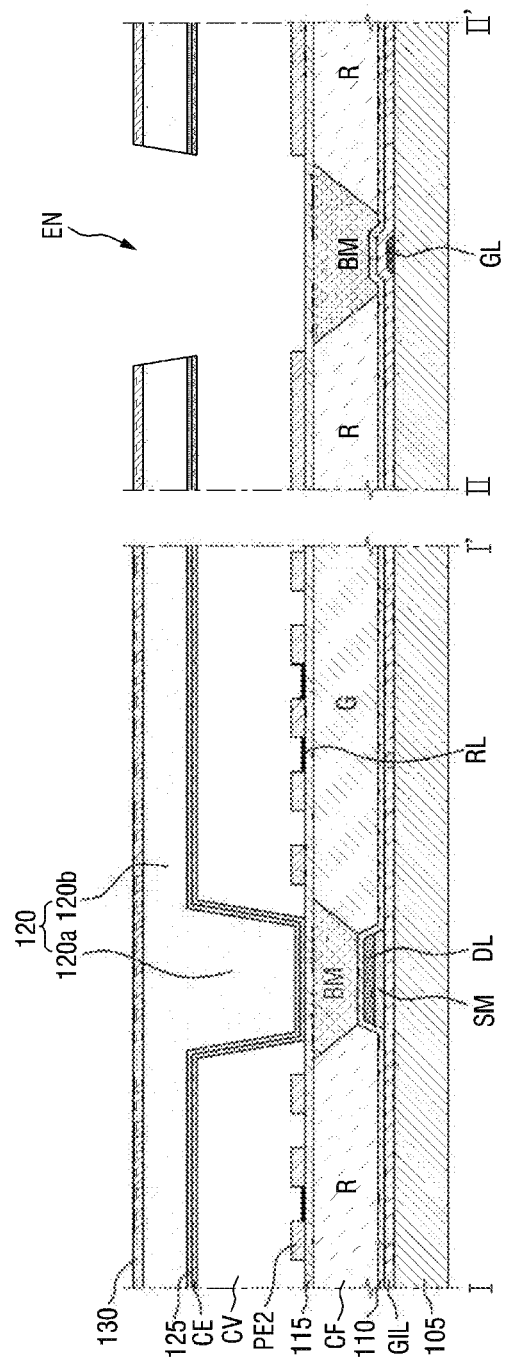

Then, referring to FIG. 16, the sacrificial layer SCR is removed. Accordingly, the cavity CV that is a space into which liquid crystal molecules (LC in FIG. 2) are injected is formed. The removal of the sacrificial layer SCR may be performed through an etching process and a strip process.

Figure 17:
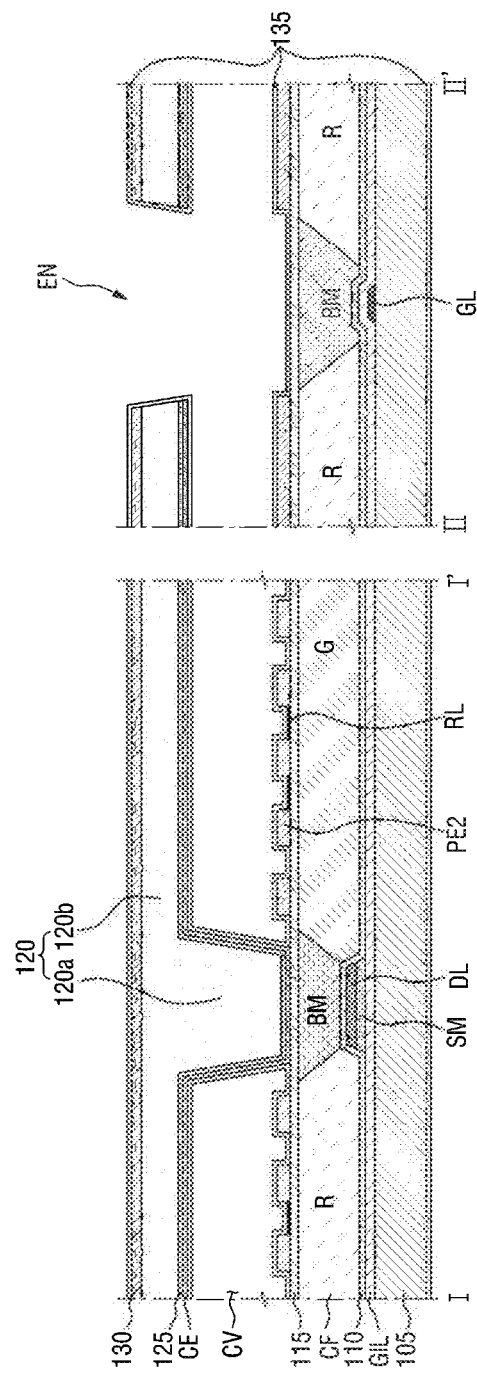

Then, referring to FIG. 17, a capping layer 135 is formed in the cavity CV to cover the pixel electrode (PE in FIG. 1) on the substrate 105 and to cover the common electrode CE on the bottom surface of the roof 120b. The capping layer 135 may include an inorganic material of which the contact angle against the alignment material of the alignment layer (140 in FIG. 2) is equal to or smaller than about 50° using an ALD method. In this case, the capping layer 135 is formed in the whole cavity CV through the ALD method, and may cover the cover layer 120, specifically, the third protection layer 130 and the substrate 105, outside the cavity CV.

Figure 18:
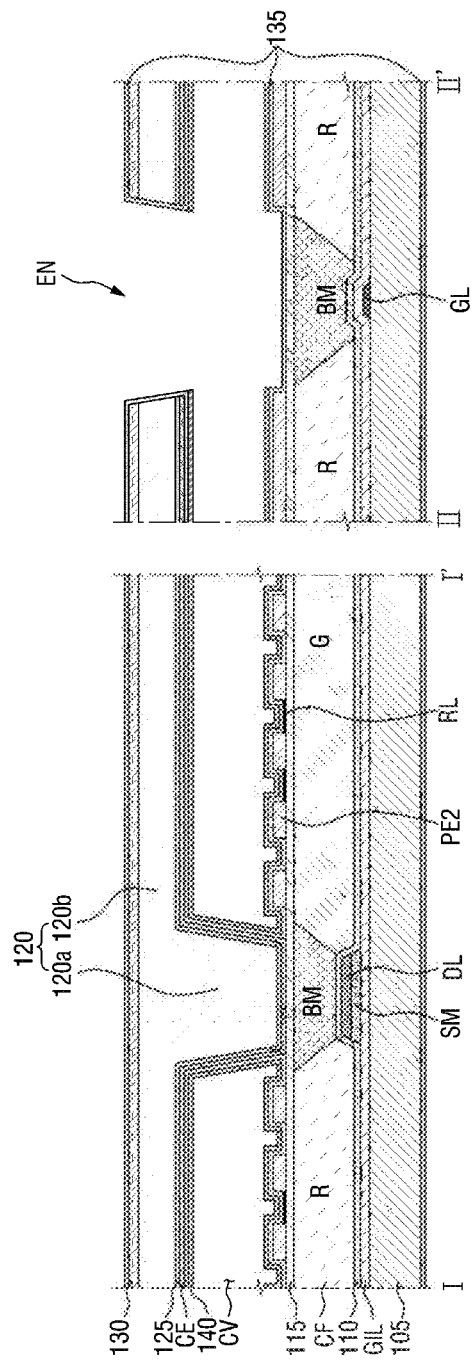

Then, referring to FIG. 18, an alignment layer 140 is formed on the capping layer 135 along the inner wall of the cavity CV. The alignment layer 140 may include a liquid crystal alignment material, such as polyamic acid, polysiloxane, or polyimide.

Figure 19:
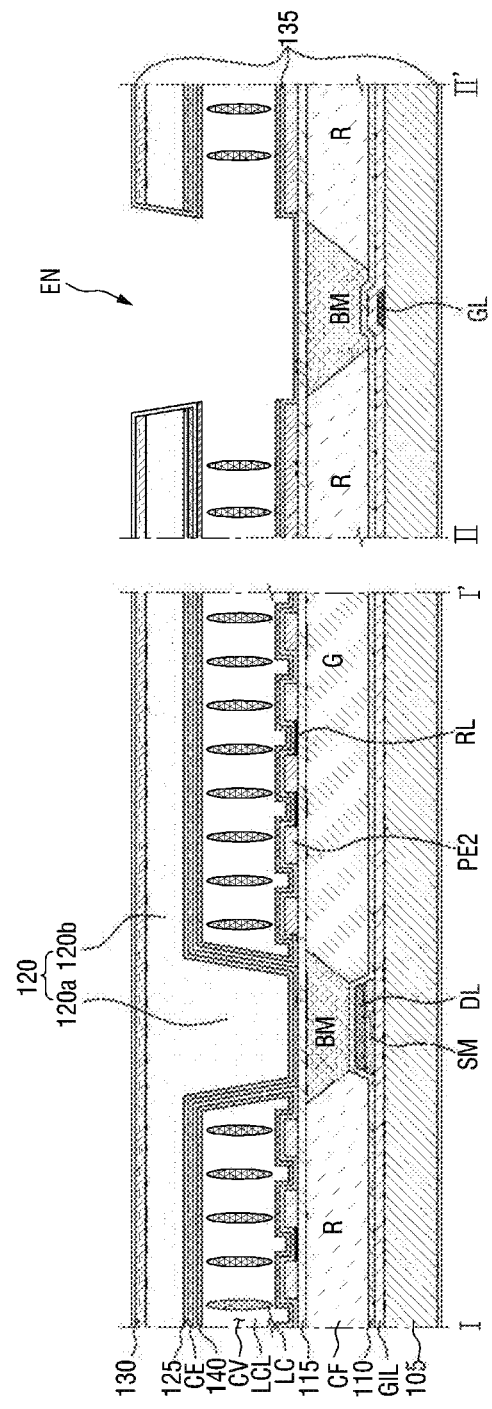

Then, referring to FIG. 19, a liquid crystal layer LCL is formed through injection of liquid crystal molecules LC into the cavity CV through the liquid crystal injection port EN.

Figure 20:
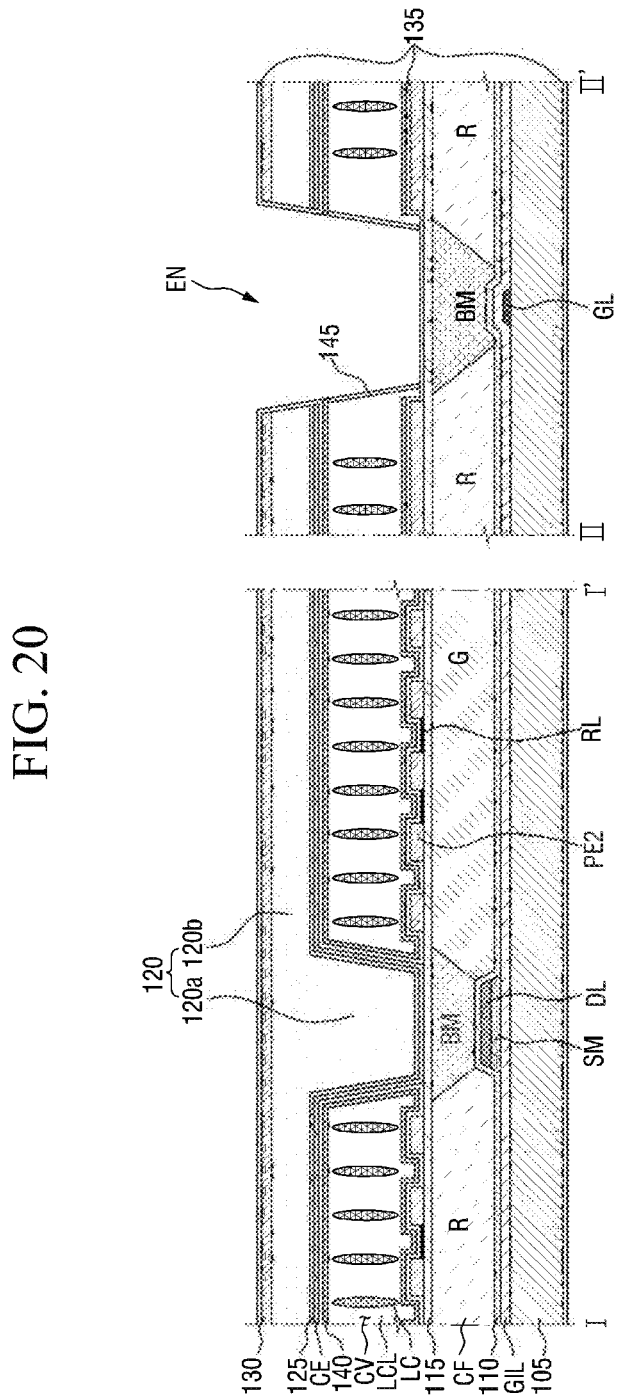

Then, referring to FIG. 20, a sealing layer 145 is formed to seal the liquid crystal injection port EN of the cavity CV. The sealing layer 145 may include a sealing material that does not react with the liquid crystal molecules LC that are injected into the cavity CV.

Figure 21:
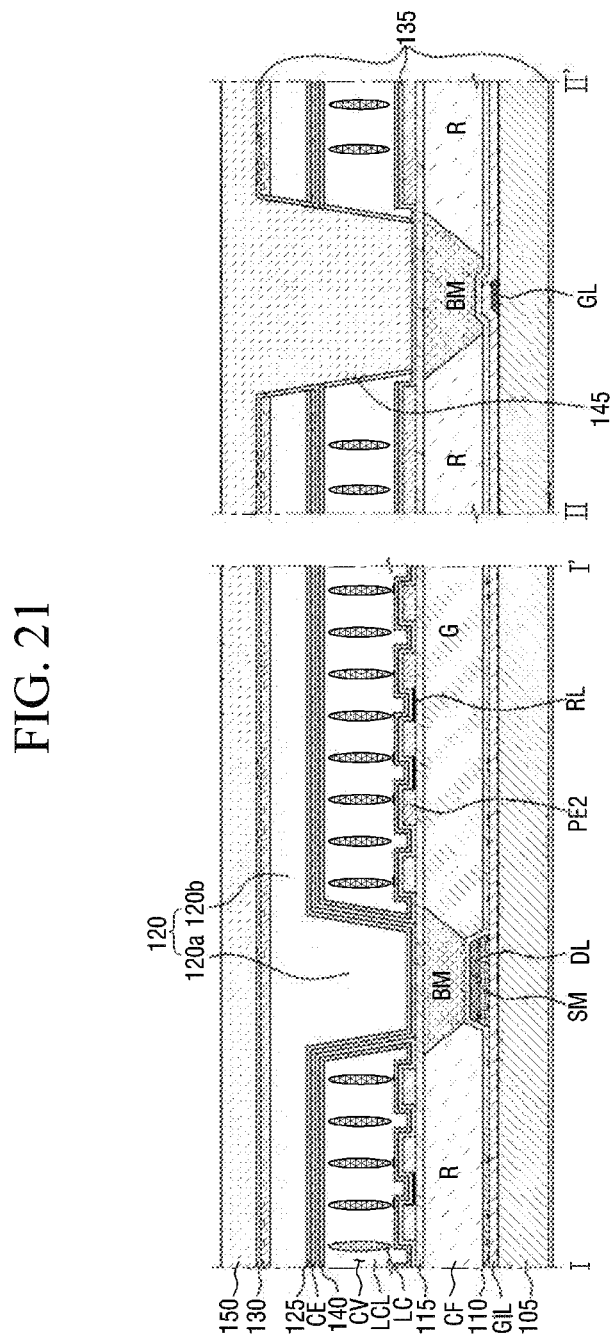

Then, referring to FIG. 21, a planarization layer 150 is formed on the capping layer 135 outside the cavity CV. The planarization layer 150 may include an insulating material through a deposition method.

Although not illustrated, the method for fabricating a liquid crystal display may further include forming an encapsulation layer on the planarization layer 150. The encapsulation layer enables the other substrate that is combined with the substrate on which thin film transistors are formed to be omitted from the existing liquid crystal display.

In concluding the detailed description, those skilled in the art will appreciate that many variations and modifications can be made to the disclosed embodiments without substantially departing from the principles of the present invention. Therefore, the disclosed embodiments of the invention are used in a generic and descriptive sense only and not for purposes of limitation.

What is claimed is:

1. A liquid crystal display comprising:
a substrate having a plurality of pixel regions;
a first electrode formed on the substrate in each of the pixel regions;
a cover layer forming a cavity, the cover layer including side walls formed on the substrate to partition the plurality of pixel regions, and a roof formed on the side walls;
a second electrode formed on the first electrode, wherein the second electrode overlaps the side walls and the roof of the cover layer;

a capping layer formed in the cavity to cover the first electrode on the substrate and to cover the second electrode on the bottom surface of the roof;

an alignment layer formed on the capping layer; and a liquid crystal layer formed through injection of liquid crystal molecules into the cavity.

2. The liquid crystal display of claim 1, wherein the capping layer is conformally formed along a surface of the first electrode.

3. The liquid crystal display of claim 1, wherein the capping layer covers the cover layer and the substrate outside the cavity.

4. The liquid crystal display of claim 1, wherein the capping layer has a thickness of about 10 Å to 100 nm.

5. The liquid crystal display of claim 1, wherein the capping layer is an atomic layer deposition (ALD) layer, and includes an inorganic material of which a contact angle against an alignment material of the alignment layer is equal to or smaller than about 50°.

6. The liquid crystal display of claim 1, wherein the capping layer includes at least one of $SiO_2$ or SiCOH.

7. The liquid crystal display of claim 1, wherein the capping layer comprises a first capping layer and a second capping layer formed on the first capping layer.

8. The liquid crystal display of claim 7, wherein the first capping layer is a molecular layer deposition (MLD) layer that includes an organic material, and the second capping layer is an atomic layer deposition (ALD) layer that includes an inorganic material of which a contact angle against an alignment material of the alignment layer is equal to or smaller than about 50°.

9. The liquid crystal display of claim 7, wherein the first capping layer includes at least one of polyimide, polystyrene, or polyethylene, and wherein the second capping layer includes at least one of $SiO_2$ or SiCOH.

10. A liquid crystal display comprising:

a substrate having a plurality of pixel regions;

a first electrode formed on the substrate in each of the pixel regions and including a plurality of separated branch electrodes;

a cover layer forming a with the substrate, the cover layer including side walls formed on the substrate to partition the plurality of pixel regions and a roof formed on the side walls;

a second electrode formed on the first electrode to be insulated from the first electrode, wherein the second electrode overlaps the side walls and the roof of the cover layer;

material having hydrophobic characteristics formed between the plurality of separated branch electrodes in the cavity;

a capping layer formed in the cavity to cover the first electrode, the material, and the second electrode;

an alignment layer formed on the capping layer; and a liquid crystal layer formed on the alignment layer.

11. The liquid crystal display of claim 10, wherein the material includes a carbon content.

12. The liquid crystal display of claim 10, wherein the capping layer is conformally formed along a surface of the first electrode.

13. The liquid crystal display of claim 10, wherein the capping layer has a thickness of about 10 Å to 100 nm.

14. The liquid crystal display of claim 10, wherein the capping layer is an atomic layer deposition (ALD) layer, and includes an inorganic material of which a contact angle against an alignment material of the alignment layer is equal to or smaller than about 50°.

15. The liquid crystal display of claim 10, wherein the capping layer includes at least one of $SiO_2$ or SiCOH.

16. A method for fabricating the liquid crystal display of claim 1, comprising:

forming the first electrode in each of a plurality of pixel units on the substrate;

forming a sacrificial layer on the substrate to cover the first electrode;

forming the second electrode on the sacrificial layer;

forming the cover layer which covers the second electrode and includes the side walls formed on the substrate to partition the plurality of pixel regions and the roof formed on the side walls;

removing the sacrificial layer;

forming the capping layer to cover the first electrode on the substrate and to cover the second electrode on the bottom surface of the roof; and forming the alignment layer on the capping layer.

17. The method of claim 16, wherein forming the capping layer comprises forming the capping layer including an inorganic material, of which a contact angle against an alignment material of the alignment layer is equal to or smaller than about 50°, using an atomic layer deposition (ALD) method.

18. The method of claim 16, further comprising forming a liquid crystal injection port on one side surface of the side walls of the cover layer, wherein removal of the sacrificial layer is performed through the liquid crystal injection port.

19. The method of claim 18, further comprising:

forming a liquid crystal layer through injection of liquid crystal molecules through the liquid crystal injection port; and forming a sealing layer to seal the liquid crystal injection port after the forming the liquid crystal layer.

* * * * *